United States Patent [19]
Leigh-Monstevens et al.

[11] Patent Number: 4,981,202
[45] Date of Patent: * Jan. 1, 1991

[54] MOTOR VEHICLE CONTROL SYSTEM

[75] Inventors: Keith V. Leigh-Monstevens, Troy; Leslie P. Branum, Sterling Heights; Brian D. Mabee, Warren, all of Mich.

[73] Assignee: Automotive Products plc, Warwickshire, England

[*] Notice: The portion of the term of this patent subsequent to Sep. 12, 2006 has been disclaimed.

[21] Appl. No.: 169,446

[22] Filed: Mar. 17, 1988

[51] Int. Cl.$^5$ .................. B60K 41/22; B60K 41/28
[52] U.S. Cl. .................................. 192/92; 192/3.56; 192/3.58; 74/335
[58] Field of Search .................. 192/3.56, 3.58, 84 R, 192/90, 0.062, 0.08, 0.076, 0.092; 74/335, 336 R

[56] References Cited

U.S. PATENT DOCUMENTS

| | | | |
|---|---|---|---|
| Re. 21,828 | 6/1941 | Fleischel | 192/3.56 |
| 2,757,769 | 8/1956 | Roise | 192/91 A |
| 3,587,233 | 6/1971 | Fischbach | 60/418 |
| 4,280,604 | 7/1981 | Lambicco | 192/3.58 |
| 4,291,586 | 9/1981 | Buetemeister | 74/335 |
| 4,591,034 | 5/1986 | Tellert et al. | 192/84 R |
| 4,648,498 | 3/1987 | Herbulot et al. | 192/84 R |
| 4,649,775 | 3/1987 | Ootani | 74/335 |
| 4,732,246 | 3/1988 | Tateno et al. | 192/0.08 |
| 4,766,774 | 8/1988 | Tamai | 74/335 |
| 4,796,739 | 1/1989 | Jonner et al. | 192/85 C |
| 4,817,468 | 4/1989 | Leigh-Monstevens et al. | 74/335 |
| 4,865,173 | 9/1989 | Leigh-Monstevens et al. | 192/0.02 R |

FOREIGN PATENT DOCUMENTS

| | | |
|---|---|---|
| 0108572 | 5/1987 | European Pat. Off. |
| 0108506 | 6/1987 | European Pat. Off. |
| 58-134256 | 8/1983 | Japan ............ 74/335 |
| 58-137647 | 8/1983 | Japan ............ 74/335 |
| 2041481 | 9/1980 | United Kingdom ........ 192/0.08 |
| 85/01254 | 3/1985 | World Int. Prop. O. |

OTHER PUBLICATIONS

Automotive Engineering Article, "Electronic Actuator Eliminates Clutch Pedal", pp. 81–85, Oct. 1984.

Primary Examiner—Richard Lorence
Attorney, Agent, or Firm—Krass & Young

[57] ABSTRACT

A control system for a motor vehicle of the type including a clutch and an manual gearbox. The control system includes an electric power module for shifting the gearbox, an electric power clutch assembly for engaging and disengaging the clutch, an electric throttle control assembly, and a control module arranged to control the gearbox power module, the clutch power module, the clutch power assembly, and the throttle control assembly in response to receipt of an operator instigated shift command signal. The control module initially operates to disable the throttle control system and disengage the clutch, thereafter operates to energize the gearbox power module in a sense to shift the gearbox to the selected position, and thereafter operates to reengage the clutch and restore operator control of the throttle control assembly. In one form of the power clutch assembly, an electric motor is positioned within the clutch housing in concentric relation to the clutch shaft and includes a screw drive assembly which is operative to move the clutch release bearing linearly to engage and disengage the clutch. In another form of power clutch assembly, an electric motor powers a hydraulic master cylinder and the output of the master cylinder is delivered to a slave cylinder associated with the clutch to engage an disengage the clutch in response to energization of the motor. In another form of power clutch assembly, an electric motor drives a pump which maintains a predetermined level of pressurized fluid in an accumulator and a solenoid valve delivers pressurized fluid from the accumulator to a slave cylinder in response to receipt of a shift command signal so as to disengage the clutch. Also disclosed are gear select lever assemblies designed to provide a two part shift command signal in which the initial signal is utilized to disengage the clutch and disable the throttle control system, and the second signal is utilized to shift the gearbox to the selected position.

31 Claims, 6 Drawing Sheets

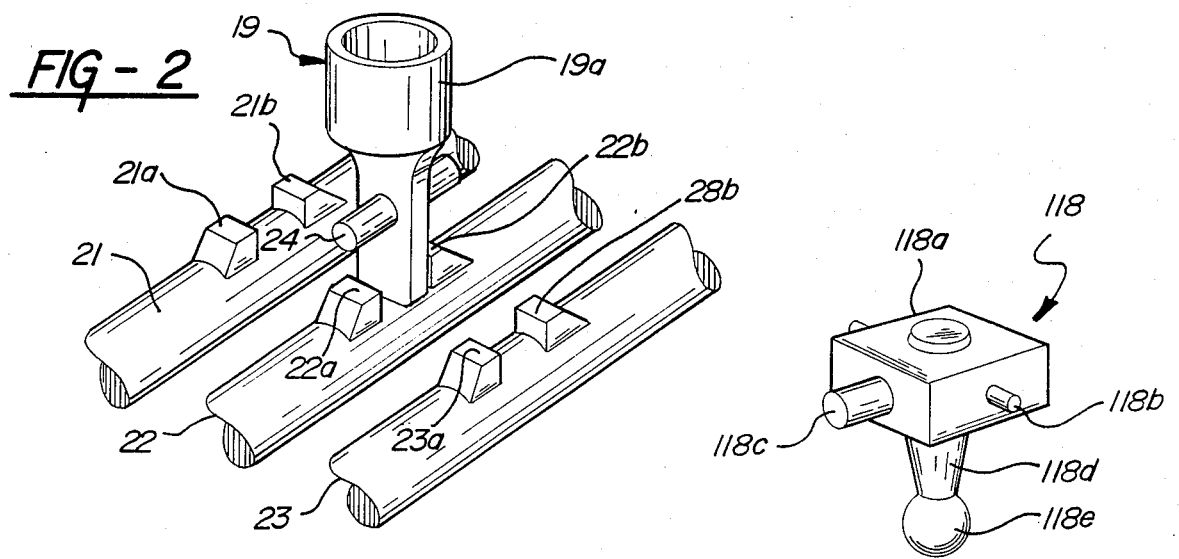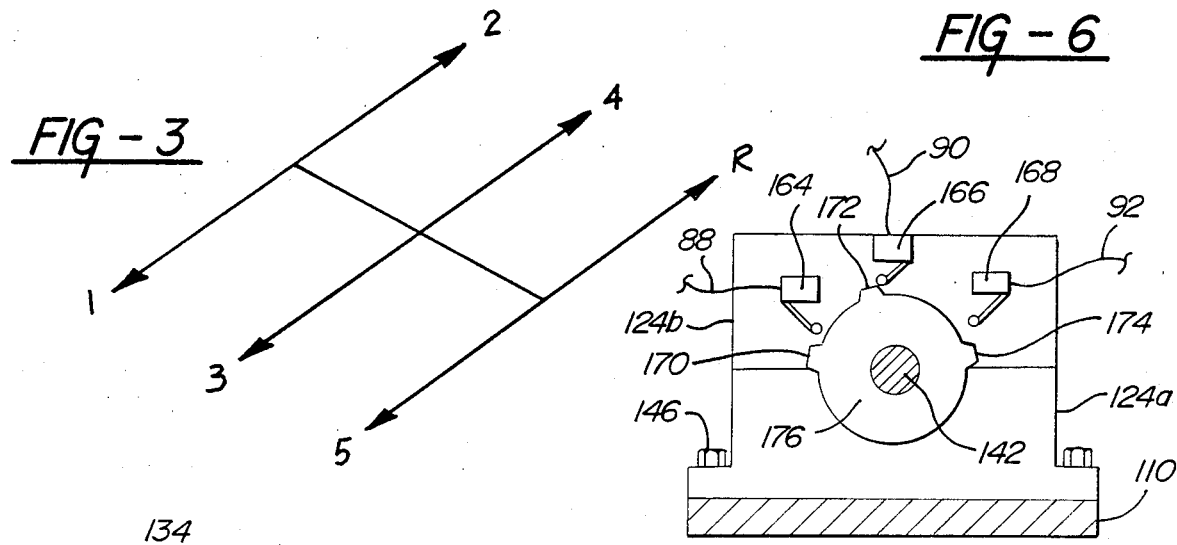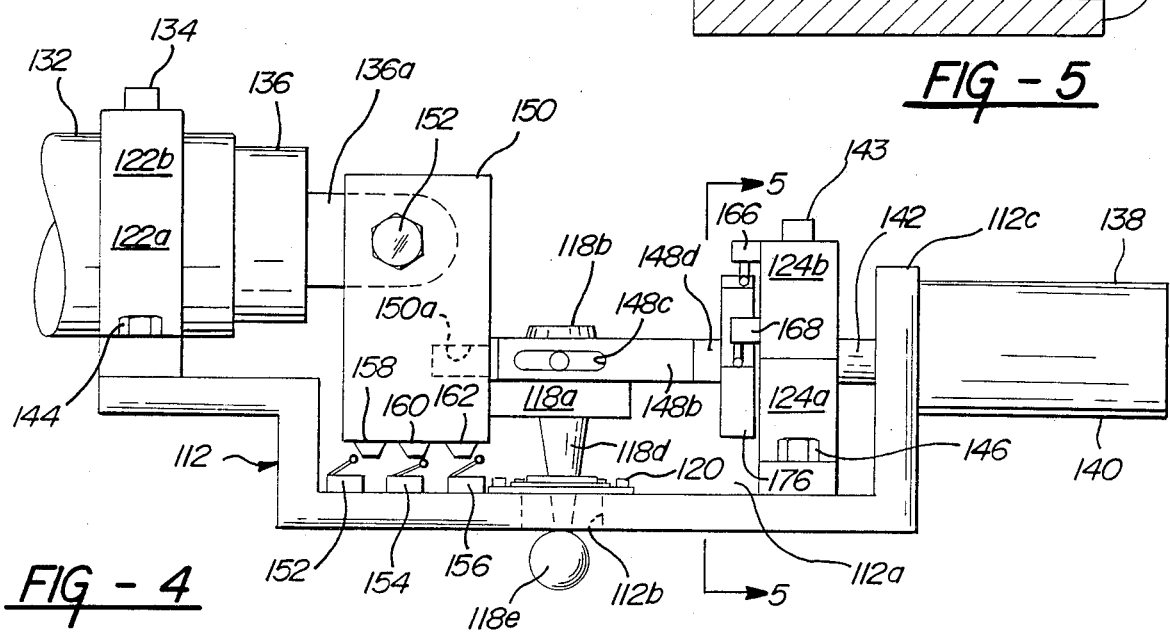

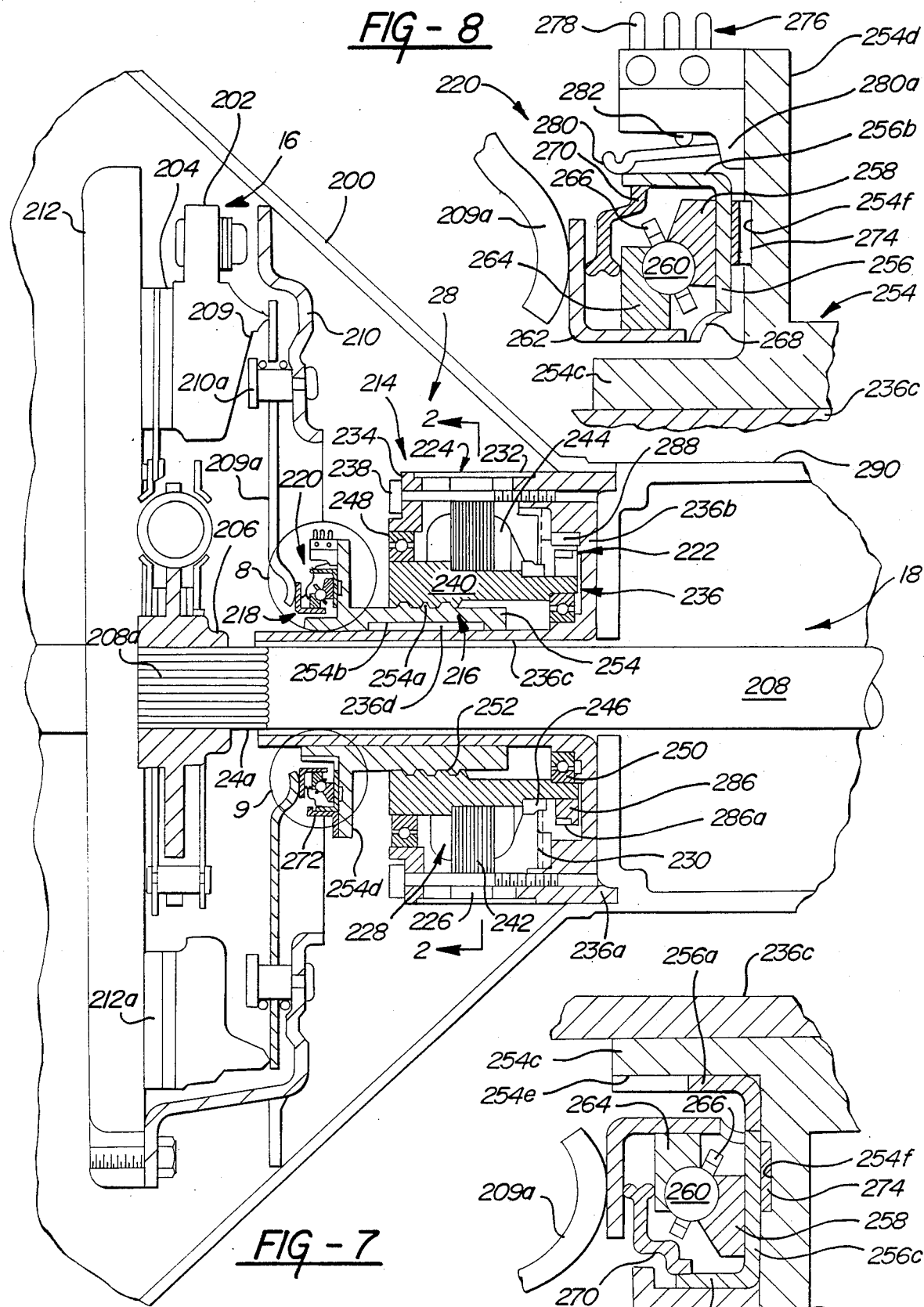

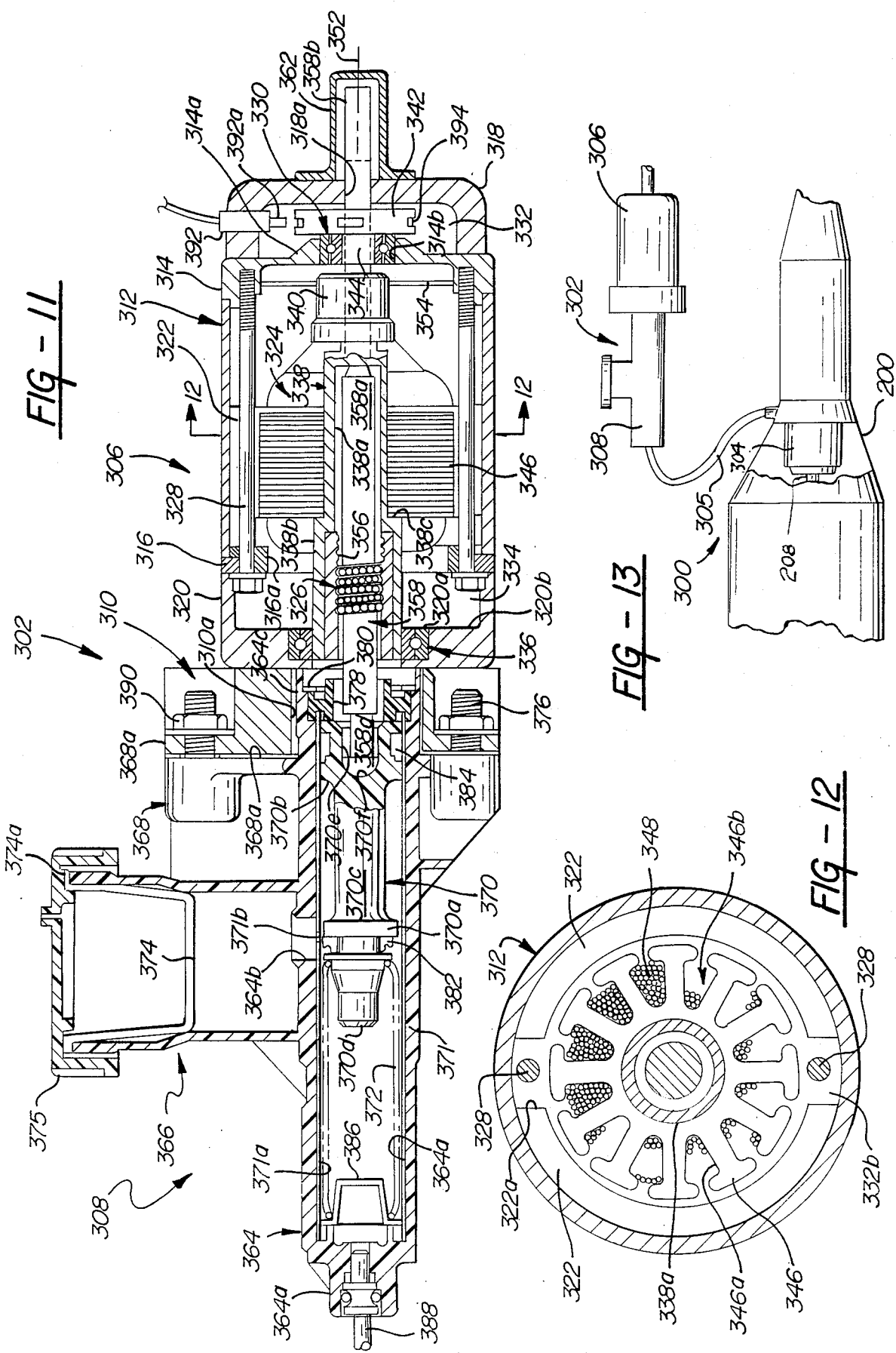

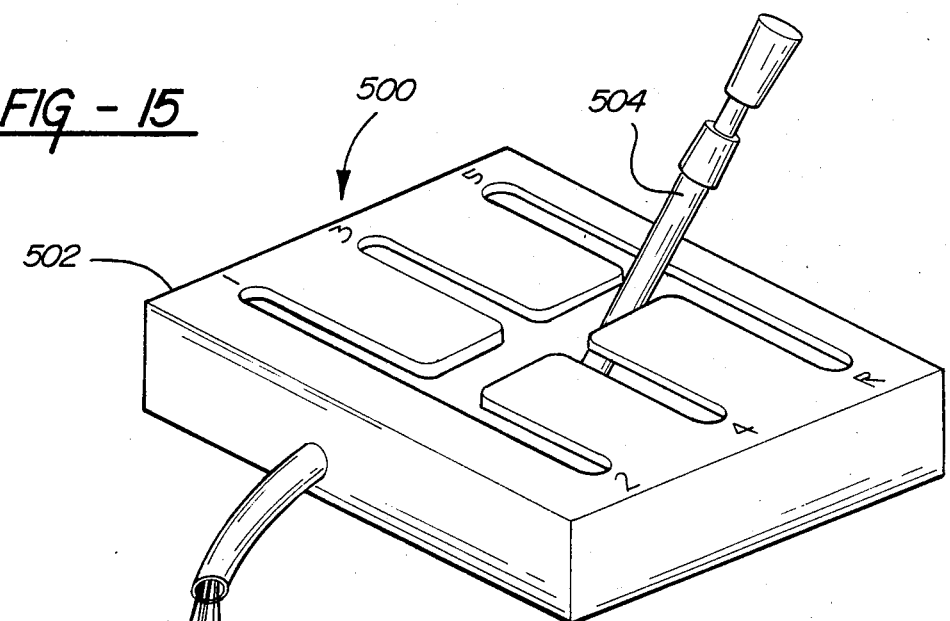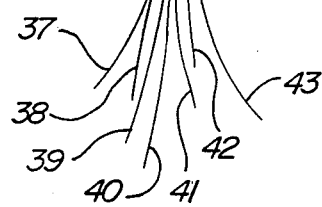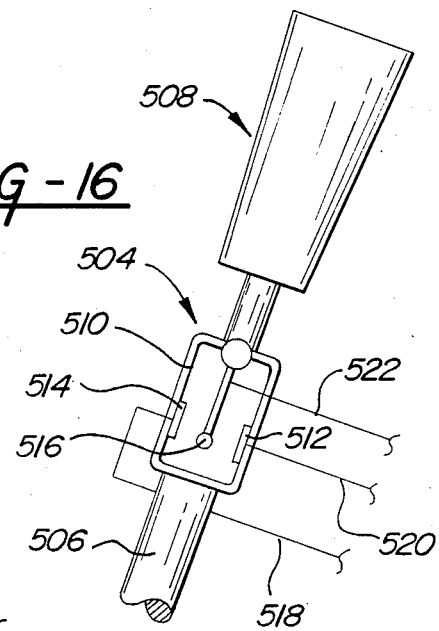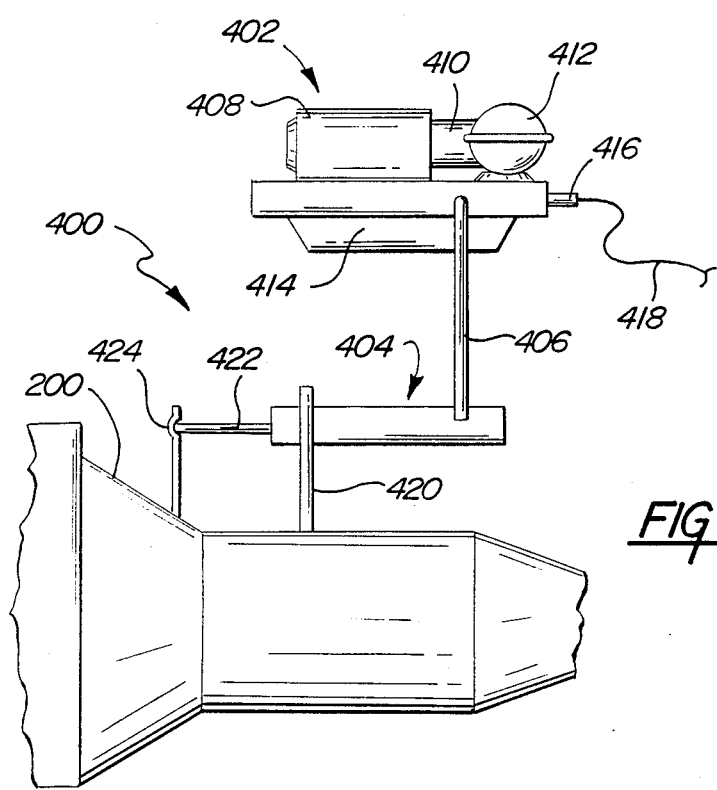

MOTOR VEHICLE CONTROL SYSTEM

BACKGROUND OF THE INVENTION

This invention relates to a motor vehicle control system and more particularly to a motor vehicle control system for use with a motor vehicle having a manual transmission.

Motor vehicle since their inception have required some manner of gear change mechanism to satisfy the varying torque and speed requirements encountered during the typical duty cycle of a motor vehicle. For many years these gear change mechanisms were manual in the sense that they required an operator input from a shift lever and operator operation of a clutch to effect each desired gear change ratio. More recently, so-called "automatic" transmissions have become popular in which much of the shifting is done without operator input in response to sensed speed and throttle opening parameters. These automatic transmissions, however, are typically relatively extensive and inherently involve a fuel economy penalty as compared to manual transmissions. They also take away much of the control of the vehicle from the driver. Various attempts have been made in the past to combine the low cost, superior fuel economy and driver control aspects of a manual transmission with the convenience aspects of an automatic transmission and, specifically, various attempts have been made to provide automatic or semi-automatic shifting for manual transmissions. However, none of these prior art attempts to facilitate and simplify the shifting of a manual transmission have met with any degree of commercial success since they have provided a slow or imprecise shifting action and/or have generated excessive warranty and maintenance costs.

SUMMARY OF THE INVENTION

This invention is directed to the provision of a control system for a manual transmission motor vehicle which provides positive and precise shifting with a minimum of driver effort, which is amenable to ready installation in the motor vehicle at the time of the original motor vehicle manufacture, and which is reliable in operation even over a long motor vehicle life.

The invention control system is intended for use with a motor vehicle of the type including a clutch and a manual gearbox having a plurality of shift positions. The control system includes a first electrical power means associated with the gearbox and operative when actuated to selectively shift the gearbox between its several positions; second electrical power means operative when actuated to selectively engage and disengage the clutch; and central control means operative in response to an operator instigated shift command signal to selectively actuate the first and second power means in a manner to disengage the clutch, shift the gearbox to the gearbox position corresponding to the shift command signal, and reengage the clutch. This arrangement provides a totally electrical system for controlling both the shifting of the gearbox and the engagement and disengagement of the clutch.

According to a further feature of the invention, the vehicle includes an operator controlled throttle pedal and an engine having a throttle body for controlling the delivery of fuel to the engine; the system further includes electrical throttle body control means operative to control the position of the throttle body in response to an electrical signal generated by operator movement of the throttle pedal; and the central control means is further operative in response to the shift command signal to electrically disconnect the throttle body control means from the throttle pedal and place the throttle body control means under the control of the central control system. This arrangement takes the control of the throttle body away from the driver during the shifting operation so as to avoid over-revving of the engine.

According to a further feature of the invention, the first electrical power means includes an electric motor; the first electrical power means is operative in response to energization of the motor to selectively shift the gearbox between its several positions; and the central control means is operative in response to the operator instigated shift command signal to energize the motor. This arrangement provides positive electrical shifting of the gearbox upon energization of the associated electric motor in response to receipt of the shift command signal.

According to a further feature of the invention, the second electrical power means also includes an electric motor; the second electrical power means is operative in response to energization of the motor to selectively engage and disengage the clutch; and the central control means is operative in response to the shift command signal to energize the motor. This arrangement provides positive engagement and disengagement of the clutch in response to energization of the associated motor.

According to a further feature of the invention, the central control means is operative in response to receipt of the shift command signal to selectively energize the clutch engage motor and the gearbox shift motor in senses to disengage the clutch, shift the gearbox to the gearbox position corresponding to the shift command signal, and reengage the clutch. This arrangement provides total and positive electrical control of all of the operations associated with the shifting of a manual transmission.

According to a further feature of the invention, the shift command signal is generated by a gear selector assembly adapted to be positioned in the passenger compartment of the vehicle; the power shifting means is provided by an electrical power module adapted to be secured to the housing of the gearbox; and the clutch power means is provided by an electrical clutch power assembly positioned in association with the vehicle clutch. This arrangement allows the invention control system to be provided in the form of separate systems or modules to facilitate the installation of the invention control system in the motor vehicle and facilitate the repair or replacement of the invention control system.

According to a further feature of the invention, the central control means is provided in the form of a control module. This arrangement further facilitates the installation of the invention control system in the motor vehicle as well as facilitating the repair and replacement of the invention control system.

According to a further feature of the invention, the control module includes comparator means; the system further includes position sensing means operative to sense the position of the gearbox and operative to generate an electrical position signal indicative of the sensed position of the gearbox; and the comparator means is operative to receive the gear select signals and the position signals, compare the signals, and transmit an electrical control signal to the gearbox power module coded to energize the power module in a sense to move the gearbox to the selected position. This arrangement provides compact and efficient means for constantly tracking the position of the gearbox and for quickly and efficiently shifting the gearbox in response to an operator command signal.

According to a further feature of the invention, the clutch power means includes an electric motor positioned within the housing of the clutch and drive means operative in response to energization of the motor to disengage the clutch, and the central control means is operative in response to receipt of a shift command signal to energize the clutch motor. This arrangement provides a ready and efficient means of engaging and disengaging the clutch in response to a shift command signal.

According to a further feature of the invention, the motor is annular and is positioned in concentric surrounding relation to the clutch shaft with the clutch shaft passing freely and concentrically through the motor. This arrangement allows the clutch motor to be efficiently and compactly packaged within the housing of the clutch.

According to a further feature of the invention, the clutch motor includes an annular armature member concentrically surrounding the clutch shaft, and the drive means includes nut means carried by and positioned concentrically within the armature member in surrounding relation to the clutch shaft and an annular screw member positioned concentrically within the nut means in surrounding relation to the clutch shaft and threadably engaging the nut means. This arrangement further facilitates the compact packaging of the clutch motor within the clutch housing.

According to a further feature of the invention, the clutch motor further includes an annular housing member concentrically surrounding the armature member, and the drive means further includes a plurality of clutch release members arrayed about the clutch shaft and a clutch release bearing having a non-rotating race mounted on one of the members and a rotating race engaging and rotating with the clutch release members. This arrangement allows the clutch motor to be utilized in the context of the existing clutch release member and clutch release bearing.

In an alternative embodiment of the invention, the clutch power assembly includes a hydraulic master cylinder defining a bore, a piston mounted for linear movement in the bore, an electric motor, drive means operative in response to energization of the motor to move the piston linearly in the bore to eject hydraulic fluid from the master cylinder, and a slave cylinder arranged to receive the hydraulic fluid output of the master cylinder and operative to actuate the clutch; and the central control means is operative in response to receipt of a shift command signal to energize the motor. This arrangement allows the master cylinder to be quickly and positively actuated by the associated electric motor in response to receipt of a shift command signal to effect positive and rapid engagement and disengagement of the clutch. The slave cylinder supplied with pressurized fluid from the electrically driven master cylinder may be an external slave cylinder positioned exteriorally of the clutch housing or may comprise an annular slave cylinder positioned within the clutch housing in concentric surrounding relation to the clutch shaft.

In a further alternative embodiment of the invention, the clutch power means includes an electric motor, a hydraulic pump driven by the electric motor, an accumulator chamber for containing pressurized hydraulic fluid provided by the pump, a slave cylinder arranged to receive pressurized hydraulic fluid from the accumulator chamber and operative to actuate the clutch, and electrical valve means operative when energized to direct hydraulic fluid from the accumulator chamber to the slave cylinder; and the central control means is operative in response to receipt of a shift command signal to energize the electrical valve means. This arrangement allows the slave cylinder controlling engagement and disengagement of the clutch to be quickly and effectively actuated by the central control system in response to receipt of a shift command signal. As with the previous embodiment, the slave cylinder may comprise an external slave cylinder positioned exteriorly of the clutch housing or may comprise an annular slave cylinder positioned within the clutch housing in concentric surrounding relation to the clutch shaft.

According to a further feature of the invention, the shift command signal is a composite signal including a first signal and a second subsequent signal; the central control means is operative in response to the first signal to actuate the clutch power means in a manner to disengage the clutch and is operative in response to the second signal to actuate the gearbox power shift means in a manner to shift the gearbox. This composite signal arrangement separates the actuation of the clutch power assembly from the actuation of the gearbox power assembly and facilitates the relative timing of the actuation of the clutch as compared to the actuation of the gearbox.

According to a further feature of the invention, the control system includes a gear selector assembly; the shift command signal is instigated in response to operation of the gear selector assembly; the gear selector assembly includes a gear selector lever assembly; and the lever assembly includes a first movement mode operative to instigate the first phase of the shift command signal and a second movement mode operative to instigate the second phase of the shift command signal. This arrangement provides a convenient mechanical lever arrangement for instigating the first and second phases of the shift command signal.

In one embodiment of the invention, the lever assembly includes a lever mounted for pivotal movement and including a handle portion with a push button provided in the handle portion, and the first signal is instigated in response to depression of the push button and the second signal is instigated in response to pivotal movement of the lever.

In another embodiment of the invention, the lever assembly includes a first lever portion and a second lever portion and means mounting said lever portions for limited initial relative movement followed by joint movement; and the first signal is instigated in response to the initial relative movement between the lever portions and the second signal is instigated in response to the subsequent joint movement of the lever portions.

BRIEF DESCRIPTION OF THE DRAWINGS

FIG. 2 is a fragmentary perspective view showing the basic internal operation of the gearbox seen in FIG. 1;

FIG. 3 is a diagrammatic view showing the gating of the gearbox;

FIG. 4 is a fragmentary side elevational view showing a gearbox power module employed in the control system of FIG. 1;

FIG. 5 is a cross-sectional view taken on line 5—5 of FIG. 4;

FIG. 6 is a perspective view of a drive link employed in the invention control system;

FIGS. 7, 8 and 9 are views of the power clutch assembly employed in the invention control system;

FIGS. 11, 12 and 13 are views of an alternate form of the power clutch assembly;

FIG. 14 is a somewhat diagrammatic view of a still further alternate form of the power clutch assembly;

FIG. 15 is a perspective view of an alternate gear selector assembly for use in the invention control system; and FIG. 16 is a fragmentary view of an alternate gear selector lever construction.

DETAILED DESCRIPTION OF THE PREFERRED EMBODIMENTS

Figure 1:
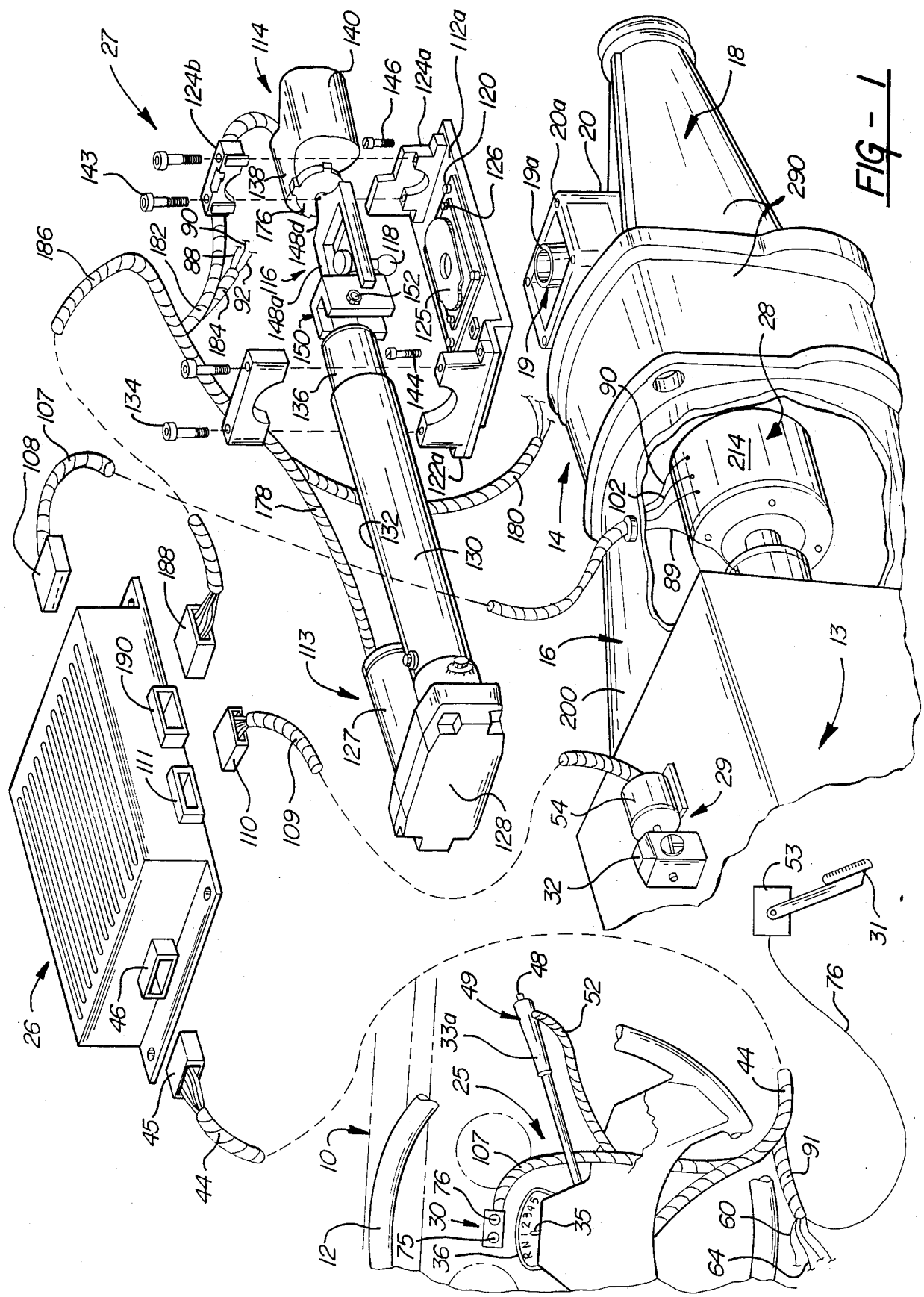
FIG. 1 is a fragmentary perspective view of a control system according to the invention.

The invention control system is seen schematically in FIG. 1 in association with a motor vehicle of the type including an instrument panel assembly 10 positioned within the passenger compartment of the motor vehicle; a steering wheel 12 associated with the instrument panel; an engine 13; and a manual transmission assembly 14 including a clutch 16 and a gearbox 18.

Gearbox 18 includes a mode select lever 19 positioned in a tower 20 and, as seen in FIG. 2, engagable at its lower end with a plurality of shift rails 21, 22, 23, each having a forward, neutral, and rearward position. Mode select lever 19 is mounted on a shaft 24 within the transmission for pivotal or crossover movement between rails 21, 22 and 23 to selectively move into driving relationship with spaced drive lugs 21a, 21b, 22a, 22b and 23a, 23b on the shift rails 21, 22 and 23 so as to be selectively drivably engaged with the shift rails. Lever 19 is also mounted for axial movement so as to move the engaged shift rail axially between its forward, neutral, and rearward positions. As seen in FIG. 3, mode select lever 19 is thus able, by a combination of crossover and axial movements, to move shift rails 21, 22 and 23 forwardly and rearwardly to achieve five forward speeds and one reverse speed. Specifically, first and second speeds may be achieved by axial forward and rearward movement of rail 21; third and fourth speeds may be achieved by axial forward and rearward movement of rail 22, and fifth speed and reverse may be achieved by axial forward and rearward movement of rail 23.

The invention control system includes a gear selector assembly 25, a control module 26, a gearbox power module 27, a clutch power assembly 28, a throttle control system 29, and an instrument panel module 30.

Broadly considered, gear selector assembly 25 is adapted to be positioned in association with the steering column assembly of the motor vehicle; control module 26 is adapted to be positioned in the passenger compartment of the motor vehicle; gearbox power module 27 is adapted to be bolted to the housing of the gearbox; clutch power assembly 28 is adapted to be positioned proximate clutch 16; throttle control system 29 is adapted to be positioned in association with the vehicle throttle pedal 31 and the engine throttle body 32; and instrument panel module 30 is adapted to be mounted in the instrument panel of the motor vehicle.

Gear selector assembly 25 includes a gear selector lever 33 mounted for pivotal movement about end 34 and including a pointer 35, a quadrant member 36 carrying suitable indicia such as R,N 1, 2, 3, 4, 5 corresponding to the positions of the associated transmission, and a plurality of leads 37, 38, 39, 40, 41, 42 and 43 respectively associated with each of the quadrant positions R,N, 1, 2, 3, 4, 5 and respectively representing circuits that are completed in response to movement of selector lever 33 to a respective position so that leads 37–43 respectively carry control signals respectively generated in response to movement of selector lever 33 through the various indicated positions. Leads 37–43 may, for example, be embodied in a single cable 44 extending from quadrant 36 to control module 26 and terminating at a suitable plug 45 for plugging receipt in a socket 46 in the housing 47 of the control module.

Lever 33 includes a handle portion 33a and pushbutton 48 is mounted in handle portion 33a. Pushbutton 48 coacts with a switch 49 in handle portion 33 and leads 50,51 interconnect the contacts of switch 49 with control module 26. Leads 50,51 may, as shown, be bundled into a cable 52 which in turn is bundled into cable 44 so as to connect with module 26 through plug 45 and socket 46.

Throttle control system 29 includes a linear potentiometer 53 associated with throttle pedal 31 and a throttle body control means 54 positioned on engine 13 proximate throttle body 32.

Other input leads to control module 26 include a lead 60 associated with the ignition switch 62 of the motor vehicle; a lead 64 connected to the existing vehicle speed sensor 66; leads 68 and 70 connected to the negative and positive terminals of the battery 72 of the vehicle, and including a fuse 74; a lead 76 connected to potentiometer 53; a plurality of position indicator leads 79, 80, 81, 82, 83 and 84; a lead 85 connected to a gearbox input speed sensor 86; a lead 87 connected to an engine speed sensor 88; and leads 89 and 90 connected to clutch power assembly 28. Leads 60, 64, 68, 70 and 76 are embodied in a cable 91 which is bundled into cable 44 so as to be connectable to control module 26 via plug 45 and socket 46.

Output leads from control module 26 includes leads 93 and 94 associated respectively with electric bulbs 95 and 96 embodied in an instrument panel module 30; power leads 97, 98, 99 and 100 associated with gearbox power module 27; power leads 101 and 102 associated with clutch power assembly 28; and power leads 104 and 106 associated with throttle body control means 54. Leads 93 and 94 are embodied in a cable 107 and cable 107 is bundled into cable 44 so as to be connectable to control module 26 via plug 45 and socket 46.

Leads 89,90,101 and 102 connecting power clutch assembly to module 26 may be bundled into a cable 107 so as to be connectable via a plug 108 received in a module socket. Leads 104,106 connecting throttle body control 54 to module 26 may be bundled into a cable 109 so as to be connectable to module 26 via a plug 110 received in a socket 111.

Power module 26 includes a bracket 112; a linear motor assembly 113; an angular motor assembly 114; a joint mechanism 116; and a drive link 118. Bracket 112 is adapted to be secured to the upper face of transmission tower 22 by a plurality of bolts 120 passing downwardly through suitable holes in the bracket for threaded receipt in threaded bores 22a in tower 22. A first bearing block assembly 122a, 122b is secured to the front end of bracket 112, a second bearing block assembly 124a, 124b is secured to the rear end of the bracket, and an elastomeric boot 125 is secured to the upper face 112a of the bracket in overlying relation to an aperture 112b in the bracket by a plurality of screws 126.

Linear motor assembly 113 may be of the type, for example, available from Saginaw Division of General Motors Corporation as Model HiTec 90. Assembly 113 includes an electric motor 127 connected to output leads 99,100 from control module 27, a gear reduction unit 128 driven by motor 127, and a ball screw assembly 130 driven by gear reduction unit 128. Ball screw assembly 130 includes an outer tube 132, clamped between the upper and lower bearing block halves 122a, 122b by bolts 134, and an inner tube or nut 136 which is advanced or retracted linearly and in known manner in response to energization of motor 127.

Angular motor assembly 224 includes an electric DC motor 138 connected to output leads 97,98 from control module 26, and a speed reduction unit 140 driven by motor 138 and having an output shaft 142. Assembly 114 may for example comprise a unit available from Buhler Products Inc. of Raleigh, N.C. as part no. 61.42.322. Output shaft 142 of motor assembly 114 is received within the upper and lower bearing block halves 124a, 124b with a suitable bushing (not shown) positioned between the faces of the bearing block halves and the shaft 142 to firmly position shaft 142 within the bearing block but allows rotational movement of the shaft within the bearing block. Bolts 143 secure bearing block half 124a to bearing block half 124b. Motor assembly 114 is mounted in suitable fashion on an upstanding flange portion 112c at the rear end of bracket 112, and bearing block assemblies 122 and 124 are suitably secured to the front and rear ends, respectively, of bracket 112 by bolts 144 and 146.

Joint mechanism 116 includes a fork member 148, including left and right arms 148a and 148b defining axially extending slots 148c, and a journal member 150. Journal member 150 is suitably secured as by a bolt 152 to the flattened end portion 136a of nut 136 and includes a blind bore 150a opening in its rear face 150b. Fork member 148 further includes a central shaft portion 148d forming a forward extension of the output shaft 142 of speed reduction unit 140.

Drive link 118 includes a monolithic main body portion 118a sized to fit slidably between fork arms 148a and 148b, diametrically opposed and laterally extending pin portions 118b, a forwardly extending journal portion 118c, a downwardly extending stem portion 118d, and a ball joint portion 118e. Drive link 118 is mounted in joint mechanism 116 with pin portions 118b guiding in slots 148c, journal portion 118c journaling in blind bore 150a of journal member 150, and stem portion 118d extending downwardly through boot 125 to dispose ball joint portion 118a in a position for coaction with transmission mode select lever 19.

A plurality of limit switches 152, 154 and 156 are disposed on the upper face 112a of bracket 112 for coaction with cam lobes 158, 160 and 162 on the underface of journal member 150, and a further plurality of limit switches 164, 166 and 168 are positioned on upper bearing block half 124b for respective coaction with cam lobes 170, 172 and 174 provided at angularly spaced locations on a cam 176 secured to the output shaft 142 of speed reduction unit 140. Input leads 79, 80, and 81 to control module 26 are respectively connected to limit switches 152, 154 and 156, and input leads 82, 83 and 84 to control module 26 are respectively connected to limit switches 164, 166 and 168. Limit switches 152, 154 and 156 establish a forward, neutral, and rearward position for journal member 150 and are respectively spaced by amounts calibrated to move shift link 118 and thereby mode select lever 19 by axial amounts necessary to move rails 21, 22 and 23 between their forward, neutral and rearward positions. For example, limit switches 152, 154 and 156 may be positioned to allow 10 millimeters of axial movement between each limit switch position and a total of 20 millimeters of axial movement between the forward and rearward positions of journal member 150. Similarly, limit switches 164, 166 and 168 establish left, center, and right angular positions of shaft 142 and are respectively spaced by angular amounts calibrated to move shift lever 118 and thereby mode select lever 19 by angular amounts necessary to move lever 19 angularly into respective driving relationship with rails 21, 22 and 23. For example, limit switches 164, 166 and 168 may be spaced to allow 19 degrees of angular movement between each limit switch position and a total of 38 degrees of angular movement between the extreme left and right positions of lever 118.

Motor leads 99 and 100 are contained in a cable 178; limit switch leads 79, 80 and 81 are contained in a cable 180; motor lead 97 and 98 are contained in a cable 182; limit switch leads 82, 83 and 84 are contained in a cable 184; and cables 178, 180, 182 and 184 are bundled together to form a cable 186 which terminates in a plug 188 for coaction with a socket 190 in housing 47 of control module 26.

Clutch 16 is of known form and includes a bell housing 200, a pressure plate 202, a clutch disk 204 drivingly connected to a central internally splined hub 206, a clutch shaft 208 having a splined portion 208a at its forward end for sliding and driving coaction with hub 206, a diaphragm spring 209 defining a plurality of circumferentially spaced clutch release fingers 209a, and a clutch cover 210 defining pivot posts 210a pivotally mounting the clutch release fingers 209a. It will be understood that cover 210 is secured to the fly wheel 212 of the vehicle and that pivotal movement of clutch release fingers 209a moves pressure plate 202 forwardly and rearwardly to selectively clamp and release clutch disk 204 from clamping engagement between the pressure plate and friction material 212a carried by the rearward annular face of the fly wheel so as to engage and disengage the clutch and so as to selectively transmit power through hub 206 and through clutch shaft 208 to gearbox 18.

Clutch power assembly 28 includes a motor 214, drive means 216, a release bearing 218, preload sensing means 220, and position sensing means 222.

Motor 214 includes a housing 224, permanent magnets 226, an armature assembly 228, and brushes 230.

Housing 224 includes an annular housing member 232, an annular front end cap 234, and an annular rear end cap 236. Rear end cap 236 includes an outer annular flange portion 236a, an annular radially extending rear end wall portion 236b, and a central hollow quill or hub portion 236c extending forwardly from rear end wall portion 236b and defining an annular through passage sized to loosely pass clutch shaft 208. Housing members 232, 234 and 236 are clampingly held together by a plurality of tie bolts 238.

Permanent magnets 226 are of arcuate configuration and are positioned in known manner on the circumferential interior of annular housing member 232 with their adjacent ends circumferentially spaced to pass through bolts 238.

Armature assembly 228 includes an annular armature member 240, a plurality of laminations 242 mounted in known manner on annular armature member 240, windings 244 passing in known manner through laminations 242, and a commutator 246 secured to armature 240 rearwardly of laminations 242 and windings 244.

Brushes 230 extend between housing end cap 236 and commutator 264. Armature assembly 228 is rotatably mounted in motor housing 224 by a front ball bearing 248 and a rear ball bearing 250, and armature assembly 228 is caused to rotate within housing 224 in known manner upon energization of the armature assembly through brushes 230.

Drive means 216 includes nut means 252 defined on the inner periphery of annular armature member 240 and an annular screw 254 including external threads 254a threadably coacting with nut means 252. Annular screw 254 is sized to fit slidably over central housing quill 236c and is precluded from rotation relative to quill 236c by a key 236d carried by the quill and slidably received in a keyway 254b on the internal periphery of the annular screw. Annular screw 254 further includes a front annular hub portion 254c and a radial flange portion 254d. The coacting threads on nut means 252 and screw 254 may, for example, comprise acme threads.

Release bearing 218 is positioned around screw hub portion 254c proximate the front annular face of screw flange portion 254d and includes a rearward annular housing member 256, a non-rotating raceway 258 secured to the forward annular face of housing 256, a plurality of ball bearings 260, a front annular housing member or adaptor member 262, a rotating raceway 264 secured to adaptor member 262, a cage 266, and suitable seals 268 and 270. A plurality of circumferentially spaced clips 272 are secured to screw flange portion 254d. Clips 272 position the bearing in concentric relation to screw hub portion 254c and delimit axial movement of the bearing relative to the screw hub portion. A plurality of circumferentially spaced prong portions 256a extend radially inwardly from rearward housing member 256 for sliding engagement in grooves 254e provided at circumferentially spaced locations on screw hub portion 254c to preclude rotation of housing 256 and associated raceway 258 relative to the motor housing. A wave washer 274 is positioned in an annular groove 254f in the forward annular face of screw flange portion 254d and urges bearing housing member 256, and thereby release bearing 218, forwardly relative to screw hub portion 254c.

Preload sensing means 220 comprises a miniature snap action switch 276 mounted on the forward annular face of screw flange portion 254d radially outwardly of the forwardly extending portion 256b of non-rotating housing member 256. Switch 276 includes a plurality of terminals 278 and a switch lever 280. Lever 280 engages housing portion 256b and is pivotable about its rearward end 280a to selectively control a push button 282 which in turn selectively controls terminals 278 to provide an open position for the switch with the lever 280 in a raised position and a closed position for the switch with the lever in a lowered position. Switch 276 may, for example, comprise a switch available from McGill Manufacturing Co. of Valparaiso, Ind. as Part No. 4906-2110 Series.

Position sensing means 222 includes an annular member 286 carried on the rearward end of armature member 240, a plurality of magnet segments 286a positioned at circumferential locations about annular member 286, and a proximity switch 288, such for example as a Hall Effect switch, positioned radially outwardly of annular member 286 and mounted on housing end cap 236.

Motor 214 is sized to be mounted within clutch bell housing 200 in concentric surrounding relation to clutch shaft 208 with the clutch shaft 208 passing centrally and freely through housing quill portion 236c for coaction with gearbox 18. Motor 214 is rigidly positioned within clutch housing 200 by clampingly positioning flange portion 236a on an annular seat defined at the juncture of gearbox housing 290 and clutch housing 200. When mounted within the clutch housing, the adaptor member 262 of release bearing 218 is urged into contact with the spring fingers 209a of the diaphragm spring of the clutch assembly. When motor 214 is energized through brushes 230, armature assembly 228 rotates, causing screw 254 to advance or retract linearly with respect to the armature assembly so as to move the release bearing 218 forwardly or rearwardly relative to release fingers 209a and respectively disengage and engage the clutch. With the clutch in its engaged position, wave washer 274 acts to urge release bearing 218 forwardly with respect to screw 254, as seen in FIG. 8, so as to maintain contact with spring fingers 209a and maintain lever 280 of switch 276 in an open position. During the initial forward movement of screw 214 upon energization of motor 214 via leads 101,102 in a sense to disengage the clutch, release bearing 218 moves rearwardly relative to screw 254 with the relative movement being allowed and resisted by wave washer 274. After a predetermined amount of such rearward movement of the bearing relative to screw 254, lever 280, as seen in FIG. 7, moves clear of the forwardly extending portion 256b of bearing housing member 256 to allow the lever to move to its downwardly pivoted position in which switch 276 is closed to generate a control signal indicating that the bearing has been preloaded to a predetermined desired extent. The preload signal would preferably, but not necessarily, be generated at such time as the radial portion 256c of housing 256 moves into bottoming engagement with the forward annular face of screw flange portion 254d, as seen in FIG. 9.

The signal thus generated by switch 276 is suitably relayed by lead 89 to control module 26 and thence via lead 90 to proximity switch 288 which proceeds to count a predetermined number of revolutions of the armature assembly as measured by the passage of the magnetic segments 286a. After a predetermined number of revolutions of the armature assembly has been counted, indicative of sufficient forward linear movement of the bearing 218 such as is required to disengage the clutch, a signal is transmitted to the control module and thence to the motor via leads 101,102 to deenergize the motor so as to terminate forward linear movement of the screw and of the release bearing. When it is desired to reengage the clutch, a suitable signal is sent to the motor 214 via leads 101,102 to energize the motor in a sense to move screw 254 linearly rearwardly. As the screw moves linearly rearwardly, the clutch is gradually engaged and the spring fingers 209a gradually pivot back to their home or retracted position. As the fingers 209a are moving toward their home or retracted position, they maintain bearing 218 in a position relative to screw 254 wherein wave washer 274 is flattened and the rear housing member 256 of the bearing is bottomed against screw flange portion 254d. At such time as the spring fingers 209a arrive at their home or retracted position, the fingers and the bearing cease moving rearwardly but the screw 254 continues to move rearwardly so that relative movement occurs between bearing 218 and screw 254. During this relative movement, wave washer 274 moves to its illustrated position of FIG. 8 in which the bearing housing member 256 has moved away from screw flange 254d. As the bearing arrives at the position seen in FIG. 8 relative to the screw, switch lever 280 is actuated upwardly to move push button 282 upwardly to in turn open switch 276 and terminate the energization of the motor so that the screw, bearing, and spring fingers are halted in their disengaged position as seen in FIG. 8.

Throttle control system 29 includes potentiometer 53, lead 76 connecting potentiometer 53 to control module 26, throttle control means 54, and leads 104,106 connecting throttle control means 54 to control module 26.

Potentiometer 53 may be of any known form and preferably is operative to generate a linear electrical signal output proportioned to the extent of movement of throttle pedal 31 so that the output of potentiometer 53 is at all times indicative, by its magnitude, of the absolute position of pivotal movement of throttle pedal 31.

Throttle control means 54 comprises a geared electric servo motor drivingly connected to throttle body 32 and normally operative to angularly position the throttle valve of the throttle body in proportion to the magnitude of the linear signal generated by potentiometer 53 so that the throttle body is normally angularly positioned in accordance with the angular position of the throttle pedal.

Operation

The invention electric shift apparatus is installed in the associated motor vehicle during the original motor vehicle assembly process. Specifically, gear selector assembly 25 is assembled in association with the steering column assembly of the motor vehicle in much the same manner as the present automatic transmission controls are provided in association with the vehicular steering column; instrument panel module 30 is mounted in the instrument panel of the vehicle in proximity to quadrant 36 of gear selector assembly 25; control module 26 is mounted in the passenger compartment of the vehicle, preferably behind the front face of the instrument panel of the vehicle; gearbox power module 27 is secured to the housing 290 of the vehicle transmission by the use of bolts 120 with the spherical end 118e of drive link 118 drivingly positioned in the hollow socket upper end 19a of mode select lever 19; clutch power assembly 28 is installed within clutch bell housing 200; throttle control means 54 is mounted on engine 13 in proximity to throttle body 32; plugs 45,108, 110 and 118 are inserted into the corresponding sockets of the housing of control module 26; and leads 60, 64, 68, 70 and 76 embodied in cable 91 are respectively connected to the vehicle ignition, the vehicle speed sensor, the vehicle battery, and potentiometer 53. The system is now operational.

In use, it will be seen that limit switches 152, 154 and 156 provide a constant indication of the linear position of journal member 150, and thereby a constant indication of the linear or shift position of select lever 19, and limit switches 164, 166 and 168 provide a constant indication of the angular position of shaft 142, and thereby the angular or crossover position of select lever 19, so that the two position readings from the two sets of limit switches, taken together, provide an accurate and constant indication of the shift position of the transmission. Simultaneously, leads 37–43 provide a constant indication of the transmission position selected by the operator by appropriate positioning of shift lever 33; lead 60 provides a constant indication of the open or closed position of the vehicle ignition; lead 64 provides a constant signal representative of the instantaneous speed of the vehicle; leads 68 and 70 provide battery power for the system; and lead 76 provides an indication of the instantaneous position of throttle pedal 31.

Figure 10:
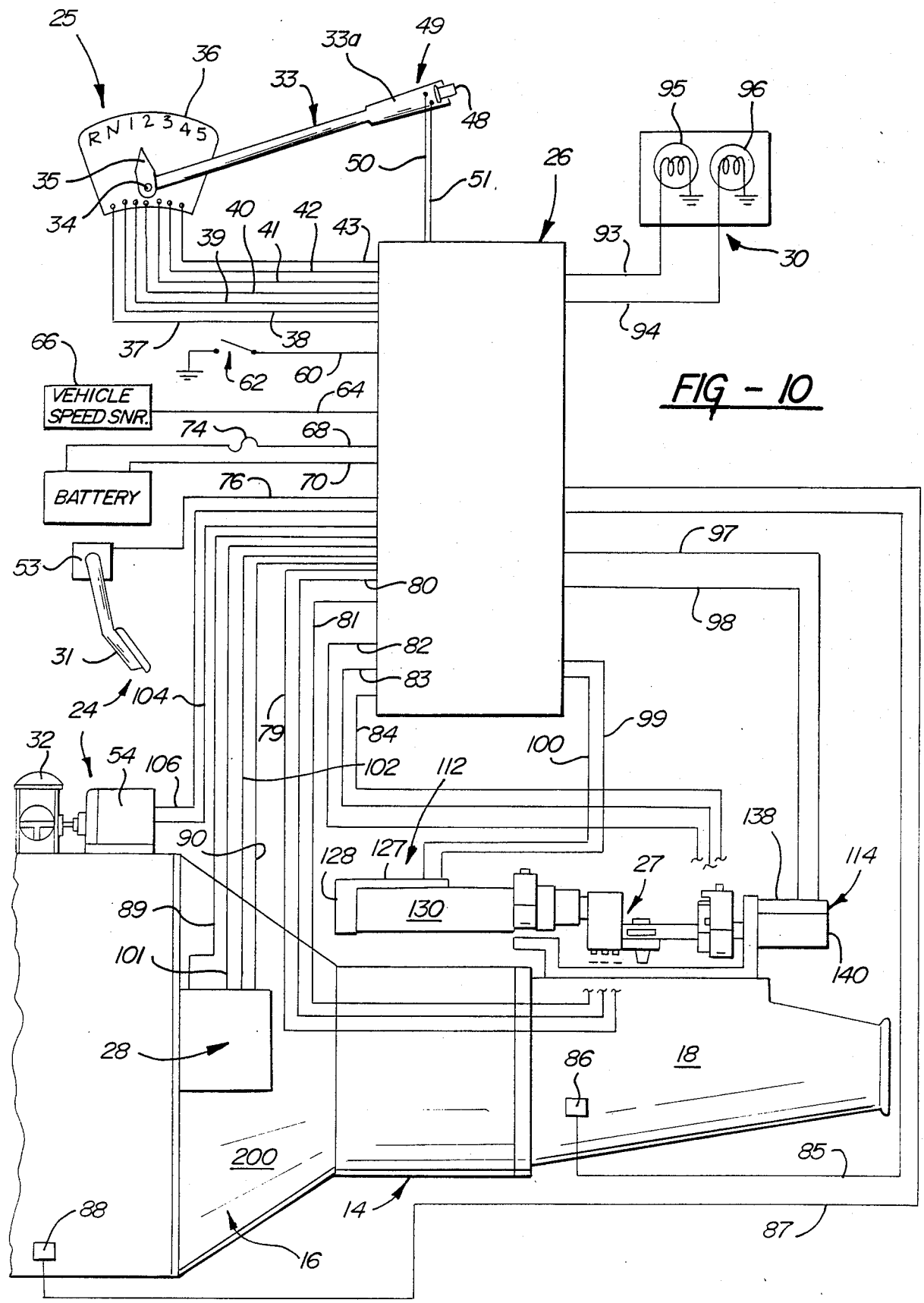
FIG. 10 is an electrical schematic diagram of the invention control system.

In use various input signals, such as described above and illustrated in FIG. 10, are supplied to control module 26, which preferably includes a programmable logic array or a gate array. Control module 26 is configured to receive these input signals and generate the necessary output signals to control the various components of the invention control system.

Specifically, as the operator depresses button 48 on shift lever 33 preparatory to instigating a shift operation, the control module, upon receipt of the fact that switch 49 has been closed by depression of pushbutton 48, generates a signal to clutch power assembly 28 and simultaneously disrupts the electrical connection between potentiometer 53 and throttle body motor 54. The output signal transmitted to clutch power assembly 28 serves to energize the motor 214 of the clutch power assembly in a sense to disengage the clutch with preload sensing means 220 and position sensing means 222 functioning in the manner previously described to allow initial preloading of the release bearing 218 and to measure the amount of forward movement of screw 254 required to effect disengagement of the clutch. With respect to the throttle control system, the interruption of the interconnection between potentiometer 53 and throttle body motor 54 has the effect of taking the control of the throttle body 32 away from the operator and placing this control with the control module which may be suitably programmed to provide specific control of the throttle body during the shift operation so as to avoid over-revving of the engine that might otherwise result upon disengagement of the clutch. Following depression of pushbutton 48 to energize the power clutch assembly and disable the throttle pedal 31, shift lever 33 is pivoted to a position corresponding to the desired shift position and control module 26 thereafter functions to generate the necessary drive signals to linear motor 112 and angular motor assembly 114 for providing the selection of the desired gear.

Specifically, the various input signals are formed into a set of logic signals. These logic signals include a set of signals whose state is selected by the gear selector assembly 25.

Broadly, control module 26 serves to compare the inputs indicating the gear selected with the inputs indicating the present gear. If they differ, then control module 26 generates the required sequence of output signals to linear motor assembly 112 and to angular motor assembly 114 until the present gear matches the selected gear.

Further details of the specific logic employed by control module 26 to generate the required sequence of output signals to linear motor assembly 112 and to angular motor assembly 114 to achieve the desired gear shift are disclosed in co-pending U.S. patent application Ser. No. 064,097, assigned to the assignee of the present invention and incorporated herein by reference.

In any situation where control module 26 refuses to issue a command signal in response to an operator signal, control module 26 also functions to send a signal through lead 93 to instrument panel module 30 to illuminate bulb 9 and indicate to the operator that the desired shift is inappropriate and will not be carried out. Bulb 95 thus constitutes an illegal or inappropriate shift indicator. For example, selection of a gear that would over rev the engine to a point where the engine might be damaged would be prohibited and the fact that the operator has selected an inappropriate gear would be indicated by an appropriate signal transmitted through lead 93 to illuminate illegal shift bulb 95 in the instrument panel module 30.

Following completion of the shifting operation, the operator releases the pushbutton 48 which transmits a signal to control module 26 via leads 50 and 51 to instruct the control module to transmit a signal to the clutch power assembly to energize motor 214 in a sense to reengage the clutch and to reestablish electrical connection between potentiometer 53 and throttle body motor 54 so as to return control of the throttle body 32 to the operator of the vehicle by the throttle pedal 31. Alternatively, a signal to reestablish communication between the potentiometer 53 and the throttle body motor 54 and/or the signal to reengage the clutch may be generated by control module 26, independently of release of the pushbutton 48, upon the sensed completion of the requested shifting action of the gearbox. As a further alternative, pushbutton 48 and its associated controls may be dispensed with entirely and the control module 26 may be programmed to initiate the disengagement and reengagement of the clutch and the enablement and disenablement of the throttle control system 29 upon the sensed movement of lever 33 to the desired shift position and upon the subsequent completion of the shifting operation of the gearbox. Various parameters and programs may be incorporated into the logic of control unit 26 to coordinate the engagement and reengagement of the clutch with the enablement and disenablement of the throttle control system in a manner to ensure smooth, precise and positive engagement and reengagement of the clutch. Examples of such parameters and programs are shown for example in U.S. Pat. Nos. 4,413,714, 4,418,810, 4,432,445, 4,497,397, 4,518,064 and 4,561,530, all assigned to the assignee of the present invention.

An alternate form of clutch power assembly is seen in FIGS. 11, 12 and 13. The clutch power assembly of FIGS. 11, 12 and 13, generally designated by the numeral 300, includes a master cylinder assembly 302, a concentric slave cylinder 304 and a fluid conduit 305 interconnecting the master cylinder assembly and the concentric slave cylinder.

Master cylinder assembly 302 includes an electric motor 306 and a master cylinder 308 interconnected by an adapter plate 310.

Motor 306 is of the direct current permanent magnet design and includes an annular main body housing 312, a rearward end cap 314, a forward end cap 316, an auxiliary rearward end cap 318, an auxiliary forward end cap 320, a pair of permanent magnets 322, an armature assembly 324, and a ball screw assembly 326.

Main body annular housing 312 is formed of a suitable ferrous material and is clamped between end caps 314 and 316 by through bolts 328 passing through apertures in end cap 316 for threaded engagement with tapped bores in end cap 314 so as to clamp main body housing 312 between end caps 314 and 316. End cap 316 is annular to define a central opening 316a and end cap 314 includes a central hub portion 314a defining a central aperture 314b receiving a ball bearing 330. Auxiliary rearward end cap 318 is cup-shaped and is rigidly secured to the rear face of end cap 314 by suitable fastener members (not shown) to define a cavity 332 between end cap 314 and auxiliary end cap 318. Auxiliary end cap 318 further includes a central aperture 318a of generally circular cross section with a flatted side. Auxiliary end cap 320 is cup-shaped and is suitably rigidly secured to end cap 316 by fastener means (not shown) to define a chamber 334 between auxiliary end cap 320 and end cap 316. Auxiliary end cap 320 further includes a central aperture 320a receiving a ball bearing 336.

As best seen in FIG. 12, permanent magnets 322 are arcuate and are positioned on the interior circumferential surface of housing 312 with gaps 322a and 322b therebetween for passage of bolts 328.

Armature assembly 324 includes an armature 338, a commutator 340, a position sensor 342, a journal shaft portion 344, laminations 346, and windings 348.

Armature 338 includes a tubular main body portion 338a, and an enlarged diameter tubular forward end portion 338b interconnected to main body portion 338a by an annular shoulder 338c.

Commutator 340 is of known form and is rigidly secured to the rear end of armature main body portion 338a.

Position sensor 342 is of disk configuration, is positioned within cavity 332, and is rigidly interconnected to commutator 340 by armature journal portion 344. Enlarged armature tubular end portion 338b is received in bearing 336 and armature journal shaft portion 344 is received in bearing 330 so as to mount armature 338 for rotation about central lengthwise motor axis 352. Laminations 346 are secured in face to face relation on armature main body portion 338a and include spoke portions 346a defining gaps 346b therebetween. Windings 348 are wound in known manner around laminations 346 and through gaps 346b and are interconnected to commutator 340 in known manner. Commutator 340 in turn coacts with brushes 354 carried by end cap 314. Brushes 354 provide electrical power to the commutator and thereby to the motor in known manner so that the armature assembly is caused to rotate about central axis 352.

Ball screw assembly 326 includes a ball nut 356 and a ball screw 358.

Ball nut 356 is fixedly mounted in enlarged armature tubular forward end portion 338b and includes, in known manner, a helical precision ground ball groove.

Ball screw 358 includes a main body portion 358a positioned within armature tubular main body portion 338a, a rearward extension portion 358b, a ball groove portion 358c, and a forward input rod portion 358d. Groove portion 358c coacts with the grooves of ball nut 356 to define ball races, and bearing balls circulate in known manner in the races to provide linear movement of ball screw 358 in response to rotation of armature assembly 324. Ball screw assembly 326 may be of any known type but preferably is of the internal ball return type wherein, after each turn, the balls are fed back to the preceding turn by a floating liner situated inside the nut. Extension portion 358b of the ball screw passes slidably through aligned bores in commutator 340, armature shaft journal portion 344, and position sensor 342 and through central aperture 318a of auxiliary end cap 318 to position the extreme end of the extension portion outside of auxiliary end cap 318 and within a protective cup-shaped cap 362 suitably secured to auxiliary end cap 318. Shaft extension 358b includes a flatted side for coaction with the flatted side of aperture 318a so as to preclude rotation of ball screw 358 upon rotation of armature assembly 324.

Master cylinder 308 includes a main body member 364, a reservoir 366, a flange 368, a piston 370, a sleeve 371, and a return spring 372.

Main body member 364, reservoir 366 and flange 368 are formed as a single piece integrally molded plastic member. A diaphragm 374, formed of a fluid impervious material such as ethylene propylene, is positioned within reservoir 366 and a reservoir cap 375 closes the open upper end of the reservoir and clamps the upper annular flange 374a of diaphragm 374 to the upper annular edge of the reservoir. Threaded metal studs 376 extend axially rearwardly from flange 368 in circumferentially spaced relation. Main body member 364 defines an elongated axial bore 364a and sleeve 371 is positioned in bore 364a to define an elongated cylindrical bore 371a. Sleeve 371 is metallic, extends the full length of main body bore 364a, and is maintained in position within bore 364a by an annular end cap 378 positioned in the open rearward end of bore 364a. End cap 378 is retained against axial displacement from bore 364a by a spring snap clip 380.

Piston 370 is formed of a suitable plastic material and is slidably received in sleeve bore 371a. Piston 370 includes a forward land portion 370a, a rearward land portion 370b, a spool portion 370c, and a nose portion 370d extending forwardly from forward land portion 370a. Seals 382 and 384 are respectively provided on piston land portions 370a and 370b.

One end of return spring 372 is positioned over piston nose portion 370d and the other end of spring 372 is positioned over a clip 386 positioned at the forward, discharge end of the master cylinder. Main body member 364 further defines an outlet fitting 364a at the forward, discharge end of the master cylinder for receipt of a suitable hose coupling 388 secured to one end of conduit 305. Main body member 364 further defines an inlet bore 364b providing fluid communication between reservoir 366 and bore 364a and a further bore 371b is defined in sleeve 371 for coaction with bore 364b to allow compensating flow of hydraulic fluid between the reservoir and the bore 371a in response to reciprocal movement of piston 370 within bore 371a.

Adapter plate 310 is preferably formed of a suitable metallic material and includes a generally central aperture 310a sized to loosely receive the rearward portion 364c of main body 364 projecting from the front face 368a of flange 368. Adapter plate 310 further includes apertures for passage of threaded studs 376 and cutouts to accommodate nuts 390 threaded onto studs 376. Adapter plate 310 further includes apertures (not shown) for passage of threaded bolts (not shown) for coaction with threaded bores (not shown) provided at circumferentially spaced locations in the end wall 320b of motor auxiliary forward end cap 320. Further details of master cylinder assembly 302 are shown in copending U.S. Pat. No. 4,918,921 assigned to the assignee of the present invention.

To assemble the invention master cylinder assembly, adapter plate 310 is secured to motor 306 by passage of bolts through apertures in the adaptor plate for threaded engagement with the threaded bores in end cap end wall 320b whereafter adapter plate apertures are passed over studs 376 with ball screw input rod portion 358d passing centrally and forwardly through end cap 378 and through a central bore 370e in rearward piston land portion 370b for seating engagement in a concave socket 370f defined at the forward blind end of bore 370e. Nuts 390 are then tightened onto stud 376 to provide the final master cylinder assembly. In the final assembly, the central axis 352 of motor 306 is coaxial with the central axis of bore 371a of master cylinder 308 so that axis 352 extends totally and centrally through motor 306 and master cylinder 308.

In operation, when electricity is provided in known manner to brushes 354 armature assembly 324 is caused to rotate about central axis 352 with the result that ball screw 358 advances linearly along axis 352 with the direction of linear movement depending on the direction of rotation of armature assembly 324. For example, to move piston 370 to the left as viewed in FIG. 11 in a direction to discharge pressure fluid from outlet fitting 364a, motor 306 is energized in a sense to rotate armature assembly 324 in a direction to advance ball screw 358 to the left as seen in FIG. 11.

Conversely, when it is desired to allow piston 370 to be retracted under the force of return spring 372, the motor is energized in an opposite sense to rotate armature assembly 324 in an opposite sense and move ball screw 358 to the right as viewed in FIG. 11. Note that ball screw rearward extension 358b moves within end cap 362 between its solid line and dotted line positions in response to linear movement of the ball screw between its extreme positions. The linear position of the ball screw, and thereby the linear position of piston 370, is continuously sensed by a Hall Effect proximity sensor 392 positioned in auxiliary rearward end cap 318 and including a probe 392a for coaction with a series of permanent magnet segments 394 embedded in position sensor 342 at circumferentially spaced locations thereabout. It will be understood that Hall Effect sensor 392 detects the passage of each successive magnetic segment 394 a armature assembly 324 is rotated and transmits a signal upon each such passage to a suitable counter device, such as may be provided by the logic of control module 26, so that the linear position of the ball screw and the master cylinder piston are precisely known at all times by the instantaneous reading of the counter device.

In the use of the power clutch assembly 300 in the invention control system, the output fitting 364a of the master cylinder main body 364 is connected to conduit 305 and the other end of conduit 304 is connected to a slave cylinder 304. The slave cylinder may be external to the clutch housing 200 or, as shown, may be positioned concentrically and internally within the clutch housing so as to function in known manner in response to receipt of pressurized hydraulic fluid through conduit 305 to actuate clutch release fingers 209a to disengage the clutch of the vehicle. Further details of a concentric slave cylinder of the type illustrated schematically in FIG. 13 are seen, for example, in U.S. Pat. Nos. 4,585,106, 4,585,107, 4,585,108 or 4,585,109, all assigned to the assignee of the present invention.

Master cylinder assembly 302, conduit 305, and slave cylinder 304 are preferably prefilled with hydraulic fluid by the supplier and delivered in their prefilled condition to the motor vehicle manufacturer where they may be readily installed in the motor vehicle in their prefilled condition during the assembly of the motor vehicle. Further details with respect to the construction and advantages of such prefilled hydraulic apparatus are disclosed in U.S. Pat. Nos. 4,407,125 and 4,599,860, both assigned to the assignee of the present invention.

It will be understood that when the power clutch assembly 300 is utilized in the invention control system in place of the power clutch assembly 28, the control signal generated by depression of push button 48 of the shift select lever is utilized to energize motor 306 in a sense to deliver pressurized fluid through conduit 305 to concentric slave cylinder 304 to disengage the clutch and, when push button 48 is released and/or the requested shifting of the gearbox is completed, motor 306 is energized in a sense to allow the piston of the concentric slave cylinder and the piston of the master cylinder to retreat under the force of spring 372 and clutch spring fingers 209a to allow the clutch to reengage.

A further alternate form of the power clutch assembly is seen in FIG. 14. The power clutch assembly of FIG. 14 is generally designated by the reference numeral 400 and includes a hydraulic control assembly 402, a slave cylinder 404, and a conduit 406 interconnecting hydraulic control assembly 402 to slave cylinder 404.

Hydraulic control assembly 402 includes an electric motor 408, a hydraulic pump 410 driven by motor 408, a reservoir 412, an accumulator 414, and a solenoid valve 416 connected to control module 26 by a lead 418.

Slave cylinder 14 is of known form and is positioned externally of clutch housing 200 by a bracket 420 with the free end of the slave cylinder piston rod 422 engaging a clutch release lever 424 so as to engage and disengage the clutch in known manner upon reciprocal movement of slave cylinder piston rod 422.

Hydraulic control assembly 402 inCludes an internal control system, which may be under the control of control module 26, whereby motor 408 is operated intermittently to maintain a desired predetermined pressure of the hydraulic fluid in the accumulator 414. It will be understood that when the power clutch assembly 402 of FIG. 14 is utilized in the invention control system, motor 408 functions intermittently to maintain the desired fluid pressure in accumulator 414 and solenoid valve 416 is actuated via conduit 418 in response to operator depression of push button 48 so as to transmit pressurized fluid from accumulator 414 to slave cylinder 404 and cause slave cylinder 404 to operate through clutch lever 424 to disengage the clutch and that, following completion of the requested shifting operation as sensed by release of push button 48 or as sensed by the logic of the control module, solenoid valve 416 is actuated in a sense to dump conduit 406 to atmospheric pressure so as to allow the clutch to return to its engaged position under the force of fingers 209a.

An alternate gear selector assembly is seen in FIG. 15. The alternate gear selector assembly of FIG. 15 is generally designated by the reference numeral 500 and includes a housing or console 502 defining a double H gated configuration to provide six positions including forward speeds, 1, 2, 3, 4, and 5, and reverse, and a gear selector lever 504 mounted in known manner so as to be movable between the six positions provided by the gating of the console. It will be understood that limit switches (not shown) are associated with each position of the shift lever, including a neutral position in which lever 504 is centrally gated, and that leads 37, 38, 39, 40, 41, 42 and 43 are interconnected to the various limit switches associated with the several positions of the shift lever for connection to the control module 26. Shift lever 504, as best seen in FIG. 16, is a compound structure including a lower portion 506 for coaction with the gating of the console and an upper portion 508. The upper end of lever portion 506 defines a switch housing 510 including contacts 512, 514 and upper lever 508 is swivelly mounted in switch housing 510 and includes a lower contact 516 adapted to be moved into respective engagement with contacts 512 and 514 in response to pivotal movement of upper lever 508 relative to lower lever 506. Leads 518, 520 and 522 respectively connect to contacts 512, 514 and 516, and these leads are suitably connected to control module 26.

In the use of the gear selector assembly 500 of FIGS. 15 and 16, the initial movement of the lever 504 in response to a gear selecting movement of the lever 504 comprises relative movement between lever upper portion 508 and lever lower portion 506. This initial relative movement brings contact 516 into contact with either contact 512 or 514, depending on whether the lever 504 is being pushed forwardly or drawn rearwardly, and operates, as previously described with reference to gear selector assembly 25, to disengage the clutch and disable the throttle control system. Following movement of the contact 516 into contact with either contact 512 or contract 514, lever portions 506 and 508 thereafter move together in joint fashion as the lever 504 is moved to the desired shift position to generate a shift signal for transmission through leads 37–43 to the control module to effect shifting of the gearbox. It will be noted that the lever construction of FIGS. 15 and 16 not only generates an initial movement signal for use in disengaging the clutch and disabling the throttle control system, but also generates a control signal which distinguishes between the direction of movement of the shift lever. This arrangement enables the control logic to be programmed to ignore a signal from switch 510 if the signal is inappropriate in view of the existing position of the shift lever. For example, if the shift lever is already in a forward position in the gate and the operator moves upper lever portion 508 forwardly relative to lower lever portion 506, the control logic ignores the signal since this signal is obviously generated by idle manipulation of the shift lever by the operator rather than signaling an intention of the operator to change the shift position. Conversely, if the shift lever is already in a rearward position in the gate and the lever 508 is pulled rearwardly relative to lever 506, the control module will again ignore the generated signal since pulling of lever 508 rearwardly in inconsistent with the desire to move the shift lever to a new shift position.

The invention control system will be seen to have many advantages. Specifically, the modular assemblies minimize components and inventory requirements; the ease of assembly of the modules minimizes assembly plant labor; the control and power modules may be pretested prior to delivery to the vehicle manufacturer with consequent improvements in reliability and warranty costs; and in general, the invention control system enables the associated manual transmission vehicle to remain the low initial cost, driver control, and superior mileage advantages of a manual transmission while eliminating the requirement to actually physically shift the gears or operate the clutch.

Whereas preferred embodiments of the invention has been illustrated and described in detail it will be apparent that various changes may be made in the disclosed embodiment without departing from the spirit or scope of the invention.

I claim:

1. A control system for a motor vehicle of the type including a clutch, a manual gearbox having a housing, gear means within the housing providing a plurality of shirt positions, and a mode select member accessible from the exterior of the gearbox housing and operative when selectively moved to move the gear means between its shift positions, and a gear shifter mechanism having a plurality of operator selected positions corresponding respectively to the shift positions, said system comprising:
    (A) a power module, including a first electric motor and an output drive member adapted to be mounted proximate the gearbox housing with said drive member drivingly engaged with the mode select member and operative when energized to move the mode select member in a manner to selectively shift said gear means between said shift positions;
    (B) electrical power means, including a second electric motor, operative when energized to selectively engage and disengage said clutch; and
    (C) an electronic control module electrically connected to said power module, said power means, and said gear shifter mechanism and operative in response to operator selection of a gear shifter mechanism position to selectively energize said first and second motors in a manner to disengage said clutch, shift said gear means to the shift position corresponding to the selected gear shift mechanism position, and reengage said clutch.

2. A control system for a motor vehicle of the type including a clutch, a manual gearbox having a plurality of shift positions, and a gear shifter mechanism having a plurality of operator selected positions corresponding respectively to the gearbox shift positions, said system comprising:
    (A) a first power means, including a first electric motor, operative in response to energization of said first motor to selectively shift said gearbox between its various positions;
    (B) second power means, including a second electric motor, operative in response to energization of said second motor to selectively engage and disengage said clutch; and
    (C) an electronic control module electrically connected to said first and second power means and to said gear shifter mechanism and operative in response to operator of a gear shifter mechanism position to selectively energize said first and second motors to disengage said clutch, shift said gearbox to the gearbox position corresponding to the selected position, and reengage said clutch.

3. A control system according to claim 2 wherein
    (D) said second power means further includes,
        a hydraulic master cylinder including a cylinder defining a bore and a piston mounted for linear movement in said bore,
        drive means operative in response to energization of said second electric motor to move said piston linearly in said bore to eject hydraulic fluid from said master cylinder, and
        a slave cylinder arranged to receive the hydraulic fluid from said master cylinder and operative to actuate said clutch.

4. A control system according to claim 3 wherein:
    (F) said clutch is contained in a clutch housing;
    (G) said clutch includes a driven disk and a clutch shaft drivingly connected to said driven disk; and
    (H) said slave cylinder is annular and is positioned within said clutch housing in concentric surrounding relation to said shaft.

5. A control system according to claim 2 wherein:
    (D) said second power means further includes:
        a hydraulic pump driven by said second electric motor,
        an accumulator chamber for containing pressurized hydraulic fluid provided by said pump,
        a slave cylinder arranged to receive pressurized hydraulic fluid from said accumulator chamber and operative to actuate said clutch, and
        electrical valve means operative when energized to direct hydraulic fluid from said accumulator chamber to said slave cylinder.

6. A control system according to claim 5 wherein said clutch is contained in a clutch housing and wherein:
    (F) said slave cylinder is positioned exteriorally of said clutch housing.

7. A control system according to claim 2 wherein
    (D) said second power means further includes
        a hydraulic master cylinder including a cylinder defining a bore and a piston mounted for linear movement in said bore,
        drive means operative in response to energization of said second electric motor to move said piston linearly in said bore to eject hydraulic fluid from said master cylinder, and
        a slave cylinder arranged to receive the hydraulic fluid from said master cylinder and operative to actuate said clutch;
        said second electric motor including an armature and an output shaft; and
        said drive means including a nut driven by said armature and thread means on said output shaft threadably engaging said nut.

8. A control system according to claim 7 wherein:
    (H) said nut comprises a ball nut;
    (I) said thread means on said output shaft comprise a ball screw; and
    (J) said drive means further includes bearing balls circulating in the races coactingly formed between the grooves in said ball screw and the grooves in said ball nut.

9. A control system according to claim 8 wherein:
    (K) said motor output shaft is mounted for rotation in said motor housing about an axis that is coaxial with the axis of said bore.

10. A control system according to claim 9 wherein:
    (L) said motor output shaft is drivingly and coaxially coupled to said piston.

11. A control system according to claim 7 wherein:
    (H) said system includes a clutch housing and said slave system is positioned interiorally of said clutch housing.

12. A control system according to claim 11 wherein said clutch includes a driven disk and a clutch shaft drivingly connected to said driven disk and wherein:
    (I) said slave cylinder is annular and is positioned within said clutch housing in concentric surrounding relation to said clutch shaft.

13. A control system according to claim 2 wherein said second power means further includes, a hydraulic master cylinder including a cylinder defining a bore and a position mounted for linear movement in said bore, drive means operative in response to energization of said second electric motor to move said piston linearly in said bore to eject hydraulic fluid from said master cylinder, and a slave cylinder arranged to receive the hydraulic fluid from said master cylinder and operative to actuate said clutch;

said second motor including an armature; and said drive means including thread means driven by said armature and a threaded drive member driven by said thread means.

14. A control system for a motor vehicle of the type including a clutch and a manual gearbox having a plurality of shift positions, said system comprising:

(A) a gear selector assembly adapted to be positioned in the passenger compartment of the vehicle and including gear selector means having respective select positions corresponding to each shift position of the gearbox and operative in response to operator selection to generate a plurality of electrical gear select signals respectively corresponding to each shift position of the gearbox;

(B) an electrical power module adapted to be secured to the housing of the gearbox and operative in response to receipt of each of said select signals to shift the gearbox respectively to the gearbox position corresponding to the received gear select signal; and (C) an electrical clutch power assembly, including an annular electric motor having an armature, a nut driven by said armature, and a screw driven by said nut, operative in response to energization of said motor upon receipt of a said gear select signal to axially advance said screw and disengage the clutch.

15. A control system according to claim 14 wherein:

(D) said electrical power module includes a drive link adapted to be connected at one end to the gearbox, and electric motor means operative to impart linear and angular movement to said drive link to shift the gearbox between its various positions.

16. A control system for controlling a manual motor vehicle gear change apparatus of the type including a clutch mechanism, a gearbox housing, a plurality of parallel axially extending shifter rails within the gearbox housing and each operating a plurality of drive gears for selective engagement with further transmission gears in response to selective axial movement of the respective rail, and a mode select member selectively engageable with each of the rails and movable in a first crossover direction to select a particular rail and in a second shift direction to move the selected rail axially, said control system comprising:

(A) a gear selector assembly adapted to be positioned in the passenger compartment of the motor vehicle and including gear selector means selectively actuable by the vehicle operator to select a plurality of gear positions each corresponding to a specific crossover and shift position of the mode select member, and means operative to generate a plurality of electrical gear select signals corresponding respectively to each position of said gear selector means;

(B) a power module adapted to be mounted in proximity to the gearbox housing and including an electric drive mechanism, including a first electric motor, adapted to be connected to the mode select member and operative when actuated to impart a combination of crossover and shift movements to said mode select member;

(C) means sensing the crossover and shift position of the mode select member and operative to generate an electrical position signal indicative of the crossover and shift position of the mode select member;

(D) an electrical clutch power assembly, including a second electric motor, operative when actuated to disengage said clutch; and (E) an electronic control module operative to receive said electrical gear select signals and said electrical position signals, to compare said signals, to transmit an electrical control signal to said clutch power assembly to actuate said assembly to disengage said clutch, and to transmit an electric control signal to said electrical drive mechanism coded to impart the specific combination and sequence of crossover and shift movements to the mode select member required to move the mode select member from its indicated crossover and shift positions to the crossover and shift positions corresponding to the operator selected position.

17. A control system for a motor vehicle of the type including a clutch and a manual gearbox having a plurality of shift positions, said system comprising:

(A) first electrical power means associated with said gearbox and operative when actuated to selectively shift said gearbox between its several positions;

(B) second electrical power means operative when actuated to selectively engage and disengage said clutch; and (C) central control means operative in response to an operator instigated shift command signal to selectively actuate said first and second power means in a manner to disengage said clutch, shift said gearbox to the gearbox position corresponding to the command signal, and reengage said clutch;

(D) said clutch and gearbox being contained in a housing assembly and being interconnected by a clutch shaft and said second electrical power means including an electric motor positioned within said housing assembly in surrounding relation to said clutch shaft and drive means operative in response to energization of said motor to disengage said clutch; and (E) said central control means being operative in response to receipt of a shift signal to energize said motor.

18. A control system for a motor vehicle of the type including a clutch and a manual gearbox having a plurality of shift positions, said system comprising:

(A) first electrical power means associated with said gearbox and operative when actuated to selectively shift said gearbox between its several positions;

(B) second electrical power means operative when actuated to selectively engage and disengage said clutch; and (C) central control means operative in response to an operator instigated shift command signal to selectively actuate said first and second power means in a manner to disengage said clutch, shift said gearbox to the gearbox position corresponding to the command signal, and reengage said clutch;

(D) said clutch and gearbox being contained in a housing assembly and said second electrical power means including an electric motor positioned within said housing assembly and drive means operative in response to energization of said motor to disengage said clutch;

(E) said central control means being operative in response to receipt of a shift command signal to energize said motor; and (F) said clutch including a driven disk and a clutch shaft drivingly connected to said driven disk and said motor being annular and being positioned in concentrically surrounding relation to said clutch shaft with said clutch shaft passing freely and concentrically through said motor.

19. A control system according to claim 18 wherein:

(G) said motor includes an annular armature member concentrically surrounding said clutch shaft; and (H) said drive means includes nut means carried by and positioned concentrically within said armature member in surrounding relation to said clutch shaft and an annular screw member positioned concentrically within said nut means in surrounding relation to said clutch shaft and threadably engaging said nut means.

20. A control system according to claim 19 wherein:

(I) said motor further includes an annular housing member concentrically surrounding said armature member; and (J) said drive means further includes a plurality of clutch release members arrayed about said clutch shaft and a clutch release bearing having a nonrotating race mounted on one of said members and a rotating race engaging with said clutch release members.

21. A control system according to claim 20 wherein:

(K) said one member is said screw member.

22. A control system of a motor vehicle of the type including a clutch and a manual gearbox having a plurality of shift positions, said system comprising:

(A) first electrical power means, including a first electric motor, associated with said gearbox and operative when actuated to selectively shift said gearbox between its several positions;

(B) second electrical power means, including a second electric motor, operative when actuated to selectively engage and disengage said clutch;

(C) central control means operative in response to an operator instigated shift command signal to selectively actuate said first and second power means in a manner to disengage said clutch, shift said gearbox to the gearbox position corresponding to the command signal, and reengage said clutch;

(D) said shift command signal comprising a composite signal including a first signal and a second subsequent signal;

(E) said control means being operative in response to said first signal to actuate said second power means in a manner to disengage said clutch and in response to said second signal to actuate said first power means in a manner to shift said gearbox;

(F) said control system including a gear selector assembly;

(G) said shift command signal being instigated in response to operation of said gear selector assembly;

(H) said gear selector assembly including a gear selector lever assembly; and (I) said lever assembly including a first movement mode operative to instigate said first signal and a second movement mode operative to instigate said second signal.

23. A control system according to claim 22 wherein:

(J) said lever assembly includes a lever mounted for pivotal movement and including a handle portion, and a push button in said handle portion; and (K) said first signal is instigated in response to depression of said push button and said second signal is instigated in response to pivotal movement of said lever.

24. A control system according to claim 22 wherein:

(J) said lever assembly includes a first lever portion and a second lever portion and means mounting said lever portions for limited initial relative movement followed by joint movement; and (K) said first signal is instigated in response to said initial relative movement and second signal is instigated in response to the subsequent joint movement.

25. A control system for a motor vehicle of the type including an operator controlled throttle pedal, an engine having a throttle body for controlling the delivery of fuel to the engine, a clutch, a manual gearbox having a housing, gear means within the housing providing a plurality of shift positions, and a mode select member accessible from the exterior of the gearbox housing and operative when selectively moved to move the gear means between its shift positions, and a gear shifter mechanism having a plurality of operator selected positions corresponding respectively to the shift positions, said system comprising:

(A) power means, including a first electric motor, associated with said gearbox and operative when actuated to selectively shift said gear means between said shift positions;

(B) electrical power means, including a second electric motor, operative when actuated to selectively engage and disengage said clutch;

(C) electrical throttle body control means, including a third electric motor, operative to control the position of said throttle body in response to an electrical signal generated by operator movement of said throttle pedal; and (D) central control means operative in response to operator selection of a gear shifter mechanism position to electrically disconnect said throttle body control means from said throttle pedal and place said throttle body control means under the control of said central control means and to selectively energize said first and second motors in a manner to disengage said clutch, shift said gear means to the shift position corresponding to the selected gear shifter mechanism position, and reengage said clutch.

26. A control system for a motor vehicle of the type including an operator controlled throttle pedal, an engine having a throttle body for controlling the delivery of fuel to the engine, a clutch, a manual gearbox having a plurality of shift positions, and a gear shifter mechanism having a plurality of operator selected positions corresponding respectively to the gearbox shift positions, said system comprising:

(A) a first power means, including a first electric motor, operative in response to energization of said first motor to selectively shift said gearbox between its various positions;

(B) second power means, including a second electric motor, operative in response to energization of said second motor to selectively engage and disengage said clutch;

(C) electrical throttle body control means operative to control the position of said throttle body in response to an electrical signal generated by operator movement of said throttle pedal; and (D) central control means operative in response to operator selection of a gear shifter mechanism position to electrically disconnect said throttle body control means from said throttle pedal and place said throttle body control means under the control of said central control means and to selectively energize said first and second motors to disengage said clutch, shift said gearbox to the gearbox position corresponding to the selected position, and reengage said clutch.

27. A control system according to claim 26 wherein said vehicle includes an operator controlled throttle pedal and an engine having a throttle body for controlling the delivery of fuel to the engine, and wherein:

(F) said system further includes electrical throttle body control means operative to control the position of said throttle body in response to an electrical signal generated by operator movement of said throttle pedal; and (G) said control module is further operative in response to a receipt of a gear select signal to electrically disconnect said throttle body control means from said throttle pedal and place said throttle body control means under the control of said control module.

28. A control system for a motor vehicle of the type including a clutch and a manual gearbox having a plurality of shift positions, said system comprising:

(A) a gear selector assembly adapted to be positioned in the passenger compartment of the vehicle and including gear selector means having respective select positions corresponding to each shift position of the gearbox and operative in response to operator selection to generate a plurality of electrical gear select signals respectively corresponding to each shift position of the gearbox;

(B) an electrical power module adapted to be secured to the housing of the gearbox and operative in response to receipt of each of said gear select signals to shift the gearbox respectively to the gearbox position corresponding to the received gear select signal;

(C) an electrical clutch power assembly, including an annular electric motor having an armature, a nut driven by said armature, and a screw driven by said nut, operative in response to energization of said motor upon receipt of said gear select signal to axially advance said screw and disengage the clutch; and (D) a control module including position sensing means operative to sense the shift position of the gearbox and operative to generate an electrical shift position signal indicative of the sensed position of the gearbox and comparator means operative to receive said gear select signals and said position signals, compare said signals, and transmit an electrical control signal to said power module coded to energize said power module in a sense to move the gearbox to the selected shift position.

29. A control system for a motor vehicle of the type including a clutch and a manual gearbox having a plurality of shift position, said system comprising:

(A) a gear selector assembly adapted to be positioned in the passenger compartment of the vehicle and including gear selector means having respective select positions corresponding to each shift position of the gearbox and operative in response to operator selection to generate a plurality of electrical gear select signals respectively corresponding to each shift position of the gearbox;

(B) an electrical power module adapted to be secured to the housing of the gearbox and operative in response to receipt of each of said gear select signals to shift the gearbox respectively to the gearbox position corresponding to the received gear select signal; and (C) an electrical clutch power assembly, including an annular electric motor having an armature, a nut driven by said armature, and a screw driven by said nut, operative in response to energization of said motor upon receipt of a said gear signal to axially advance said screw and disengage the clutch;

(D) said electrical power module including a drive link adapted to be connected at one end to the gearbox, a first electric motor means having a linearly movable output member operative to impart linear movement to said drive link, and a second electric motor means having an angularly movable output shaft operative to impart angular movement to said drive link to shift the gearbox between its various positions.

30. A control system for a motor vehicle of the type including an operator controlled throttle pedal, an engine having a throttle body for controlling the delivery of fuel to the engine, and a manual gear change apparatus of the type including a clutch mechanism, a gearbox housing, a plurality of parallel axially extending shifter rails within the gearbox housing and each operating a plurality of device gears for selective engagement with further transmission gears in response to selective axial movement of the respective rail, and a mode select member selectively engageable with each of the rails and movable in a first crossover direction to select a particular rail and in a second shift direction to move the selected rail axially, said control system comprising:

(A) a gear selector assembly adapted to be positioned in the passenger compartment of the motor vehicle and including gear selector means selectively actuable by the vehicle operator to select a plurality of gear positions each corresponding to a specific crossover and shift position of the mode select member, and means operative to generate a plurality of electrical gear select signals corresponding respectively to each position of said gear selector means;

(B) a power module adapted to be mounted in proximity to the gearbox housing and including an electric drive mechanism, including a first electric motor, adapted to be connected to the mode select member and operative when actuated to impart a combination of crossover and shift movements to said mode select member;

(C) means sensing the crossover and shift position of the mode select member and operative to generate an electrical position signal indicative of the crossover and shift position of the mode select member;

(D) an electrical clutch power assembly, including a second electric motor, operative when actuated to disengage said clutch;

(E) electrical throttle body control means operative to control the position of the throttle body in response to an electrical signal generated by operator movement of the throttle pedal; and (F) a control module operative in response to receipt of one of said gear select signals to electrically disconnect said throttle body control means from the throttle pedal and place said throttle body control means under the control of said control module and further operative to receive said electrical gear select signals and said electrical position signals, to compare said signals, to transmit an electrical control signal to said clutch power assembly to actuate said assembly to disengage said clutch, and to transmit an electrical control signal to said electric drive mechanism coded to impart the specific combination and sequence of crossover and shift movements to the mode select member required to move the mode select member from its indicated crossover and shift positions to the crossover and shift positions corresponding to the operator selected position.

31. A control system for a motor vehicle of the type including a clutch, a manual gearbox having a housing, gear means within the housing providing a plurality of shift positions, and a mode select member accessible from the exterior of the gearbox housing and operative when selectively moved to move the gear means between its shift positions, and a gear shifter mechanism having a plurality of operator selected positions correspondingly respectively to the shift positions, said system comprising:

(A) a power module, including a first electric motor and an output drive member adapted to be mounted proximate the gearbox housing with said drive member drivingly engaged with the mode select member and operative when energized to move the mode select member in a manner to selectively shift said gear means between said shift positions;

(B) second electrical power means, including a second electric motor, operative when energized to selectively engage and disengage said clutch; and (C) central control means operative in response to operator selection of a gear shifter mechanism position to selectively energize said first and second motors in a manner to disengage said clutch, shift said gear means to the shift position corresponding to the selected gear shift mechanism position, and reengage said clutch;

(D) a shift command signal being generated in response to operator selection of a gear shifter mechanism position, said shift command signal being a composite signal including a first signal and a second subsequent signal, said control means being operative in response to said first signal to actuate said second electric motor in a manner to disengage said clutch and in response to said second signal to actuate said power module in a manner to shift said gearbox.

* * * * *